(12) United States Patent
Coder et al.

(10) Patent No.: US 7,174,999 B2
(45) Date of Patent: *Feb. 13, 2007

(54) AUTOMATIC WIRE LUBRICATING DEVICE

(75) Inventors: Timothy L. Coder, Effingham, KS (US); Dennis D. Hartman, Smithville, MO (US)

(73) Assignee: WLD, LLC, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/717,752

(22) Filed: Nov. 19, 2003

(65) Prior Publication Data
US 2004/0099482 A1 May 27, 2004
US 2004/0222044 A2 Nov. 11, 2004

Related U.S. Application Data

(63) Continuation of application No. 09/991,418, filed on Nov. 15, 2001, now Pat. No. 6,725,973.

(60) Provisional application No. 60/249,413, filed on Nov. 16, 2000.

(51) Int. Cl.
*F16N 13/22* (2006.01)
(52) U.S. Cl. ............... 184/15.2; 184/15.1; 403/344
(58) Field of Classification Search ........... 184/15.1, 184/15.2; 403/344, 289, 290; 285/373, 285/419, 24, 29
See application file for complete search history.

(56) References Cited

U.S. PATENT DOCUMENTS

| 498,558 | A | | 5/1893 | Lee |
|---|---|---|---|---|
| 1,046,170 | A | * | 12/1912 | Thomas ............ 91/340 |
| 1,049,170 | A | | 12/1912 | Thomas |
| 3,565,213 | A | * | 2/1971 | Heller ............ 184/15.2 |
| 3,736,618 | A | | 6/1973 | Ramsey |
| 3,783,972 | A | | 1/1974 | Molstad |
| 4,046,225 | A | | 9/1977 | Shenk |
| 4,063,617 | A | | 12/1977 | Shenk |
| 4,069,894 | A | | 1/1978 | Black |

(Continued)

FOREIGN PATENT DOCUMENTS

CA    1 265 672    2/1990

(Continued)

OTHER PUBLICATIONS

PCT/US03/25388, PCT Search Report.

*Primary Examiner*—David Fenstermacher
(74) *Attorney, Agent, or Firm*—Fish & Richardson P.C.

(57) ABSTRACT

An automatic wire lubricating device includes first and second components each having a body section of semi-annular configuration defining a portion of a continuous cylindrical interior reservoir formed by the body sections when they are fastened together into an annular body defining a central opening, a pipe fitting attached on an outer circumferential side of the body section of the first component in flow communication with the interior reservoir such that the pipe fitting can be coupled to a soap line coming from a pump, dispensing holes circumferentially spaced apart defined through the body sections providing flow communication from the interior reservoir to the central opening, and coupler pins formed on opposite ends of the body sections of the first and second components which fit together so as to make a tight seal of the interior reservoir when the first and second components are fastened together.

3 Claims, 5 Drawing Sheets

U.S. PATENT DOCUMENTS

| | | |
|---|---|---|
| 4,296,837 A | 10/1981 | Charlton |
| 4,326,605 A * | 4/1982 | Conti .................. 184/15.1 |
| 4,391,458 A * | 7/1983 | Blakeley .................. 285/112 |
| 4,422,529 A | 12/1983 | Johansen |
| 4,498,558 A * | 2/1985 | Bendahan .................. 184/15.1 |
| 4,655,432 A | 4/1987 | Woodruff |
| 4,693,502 A * | 9/1987 | Oetiker .................. 285/334.5 |
| 4,749,059 A | 6/1988 | Jonnes et al. |
| 4,862,996 A * | 9/1989 | Chisholm .................. 184/15.1 |
| 5,022,493 A | 6/1991 | Buckelew |
| 5,269,572 A * | 12/1993 | Mefferd .................. 403/339 |
| 5,573,531 A | 11/1996 | Gregory |
| 5,595,262 A | 1/1997 | Martin |
| 5,632,356 A | 5/1997 | Sells |
| 6,451,744 B1 | 9/2002 | Chang |
| 6,725,973 B2 | 4/2004 | Coder |

FOREIGN PATENT DOCUMENTS

| | | |
|---|---|---|
| DE | 25 49 487 | 5/1977 |
| GB | 2 038 212 A | 7/1980 |
| GB | 2 077 789 A | 12/1981 |

\* cited by examiner

AUTOMATIC WIRE LUBRICATING DEVICE

This application is a continuation (and claims the benefit of priority under 35 USC 120) of U.S. application Ser. No. 09/991,418, filed Nov. 15, 2001, now U.S. Pat. No. 6,725,973 which claims the benefit of the filing date of provisional application Ser. No. 60/249,413, filed Nov. 16, 2000. The disclosures of the prior applications are considered part of (and are incorporated by reference in) the disclosure of this application.

BACKGROUND OF THE INVENTION

1. Field of the Invention

The present invention generally relates to devices for applying a lubricant to an outer surface of insulated electrical wire or the like while pulling the same through a conduit, and, more particularly, is concerned with an automatic wire lubricating device.

2. Description of the Prior Art

In order to make it easier to pull insulated electrical wire through a conduit, it is an accepted practice to first lubricate the wire with a suitable lubricant, such as soap. A common way to accomplish this task is to do so by hand. Currently electricians place liquid soap in their hands and wipe it onto the wire.

The problem with this practice is that it can be a messy procedure and difficult job to do. When applying liquid soap by hand there is a tendency to spill the soap in a large area around where the wire is being fed into the conduit. Also, the liquid soap makes the hands slick which, in turn, makes it difficult to pull the wire off the reels and feed them into the conduit. As a result, it frequently requires one person to apply the soap to the wire and another person who does not handle the soap to pull the lubricated wire through the conduit. Thus, this accepted practice requires additional manpower to do the job correctly.

Over the years various devices have been proposed for use in lubricating wire. Representative examples of these devices are disclosed in U.S. Pat. No. 3,565,213 to Heller, U.S. Pat. No. 3,783,972 to Molstad, U.S. Pat. Nos. 4,046,225 and 4,063,617 to Shenk, U.S. Pat. No. 4,069,894 to Black, U.S. Pat. No. 4,326,605 to Conti, U.S. Pat. No. 4,422,529 to Johansen, U.S. Pat. No. 4,749,059 to Jonnes et al., U.S. Pat. No. 5,022,493 to Buckelew and U.S. Pat. No. 5,632,356 to Sells. While the prior art devices of the Molstad and Conti patents appear to constitute a step in the right direction for providing a wire lubricating device, neither seems to provide an optimum solution for the problem at hand.

Consequently, a need still exists for a wire lubricating device which provides a solution to the aforementioned problem in the prior art without introducing any new problems in place thereof.

SUMMARY OF THE INVENTION

The present invention provides an automatic wire lubricating device designed to satisfy the aforementioned need. The automatic wire lubricating device is a mechanical device which allows liquid soap to be automatically and evenly applied over the wire without the liquid soap first touching the electrician's hands. The use of such device by all electrical, data, communications and maintenance personnel who pull wire through conduits will provide for a smoother pulling of the wire and less chance of damaging the wire. The use of the mechanical device also reduces manpower requirements and thus labor costs by greatly reducing cleanup time, material costs and risk of damaging the wire.

Accordingly, the present invention is directed to an automatic lubricating wire device which comprises: (a) first and second components each having a body section of semi-cylindrical configuration defining a portion of a continuous cylindrical interior reservoir formed by the body sections when fastened together; (b) means for detachably fastening the body sections together to releasably secure the body sections of the first and second components together in order to assemble the body sections into an annular body having a cylindrical configuration and defining a central opening; (c) a coupler on an outer circumferential side of the body section of the first component connected in flow communication with the interior reservoir and adapted for attachment to a soap line coming from a pump; (d) means defined through the body sections extending from the interior reservoir to the central opening for providing flow communication from the interior reservoir to the central opening when the body sections are fastened together; and (e) an externally threaded cylindrical nipple formed by one of the axially displaced ends of the assembled body sections of the first and second components for attaching a bushing thereon to keep from scaring the wire or to facilitate the attachment of a rubber grommet for ensuring a "no mess" application of soap on the wire during a pull thereof through the central opening of the assembled body sections.

The present invention also is directed to an automatic wire lubricating device which comprises: (a) first and second components each having a body section of semi-cylindrical configuration defining portion of a continuous cylindrical interior reservoir formed by the body sections when fastened together; (b) means for detachably fastening the body sections together to releasably secure the body sections of the first and second components together in order to assemble the body sections into an annular body having a cylindrical configuration and defining a central opening; (c) a coupler on an outer circumferential side of the body section of the first component connected in flow communication with the interior reservoir and adapted for attachment to a soap line coming from a pump; (d) means defined through the body sections extending from the interior reservoir to the central opening for providing flow communication from the interior reservoir to the central opening when the body sections are fastened together; and (e) tubular elements formed on opposite ends of the body sections of the first and second components which fit together so as to make a tight seal of the interior reservoir when the first and second components are fastened together.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
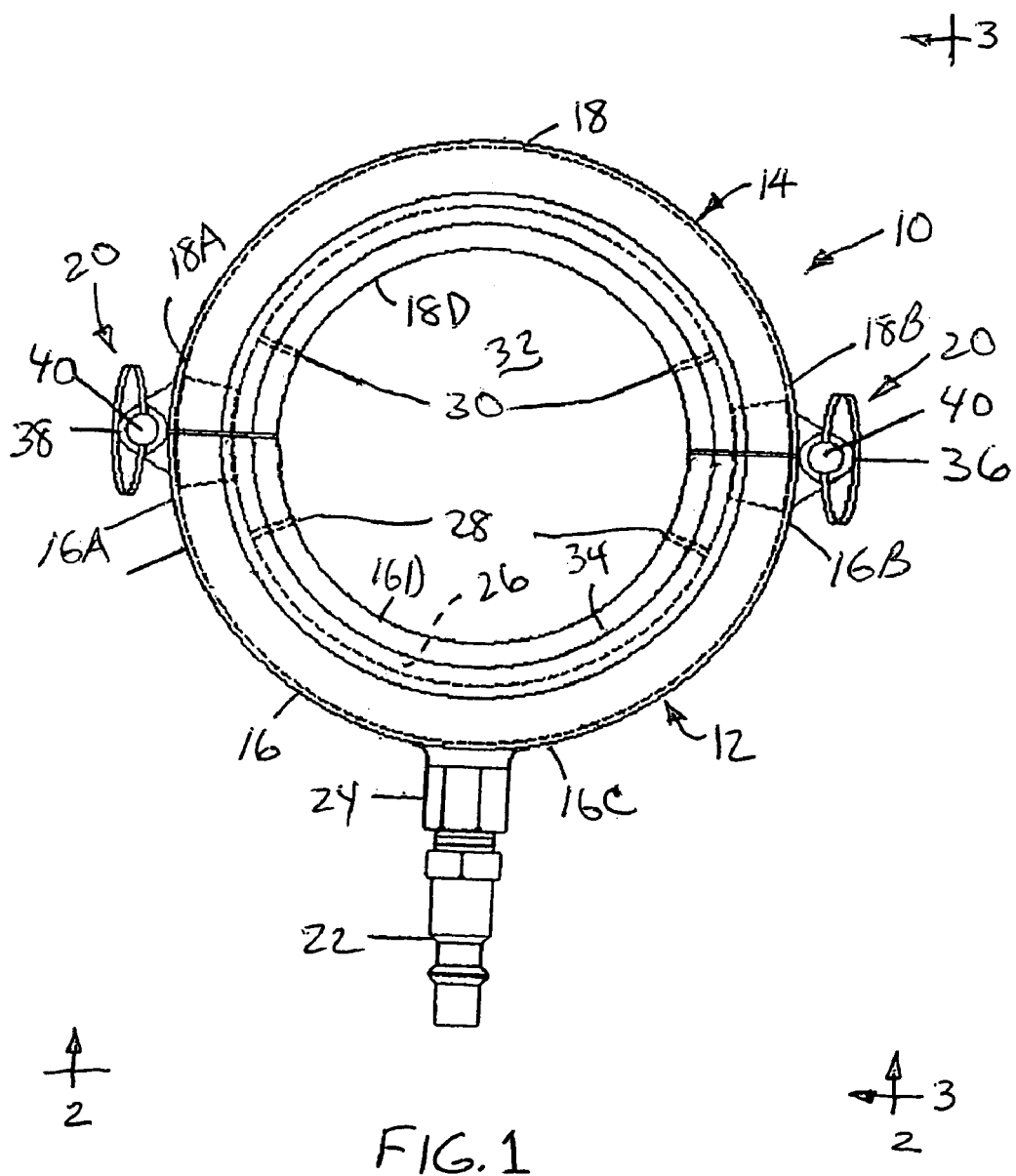
FIG. 1 is a top plan view of an automatic wire lubricating device of the present invention shown in an assembled condition.
Figure 2:
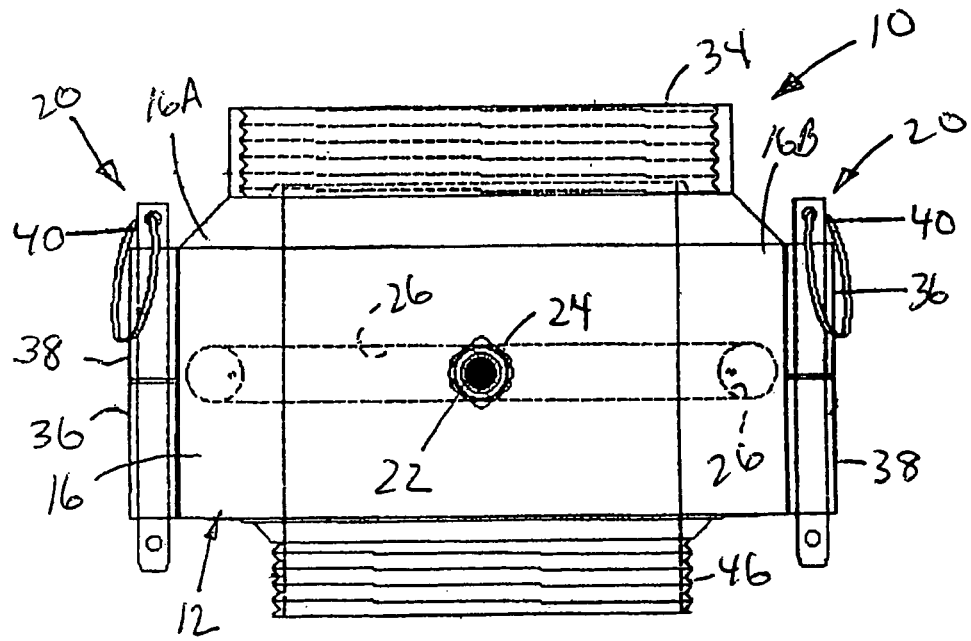
FIG. 2 is a side elevational view of the device as seen along line 2—2 of FIG. 1.
Figure 3:
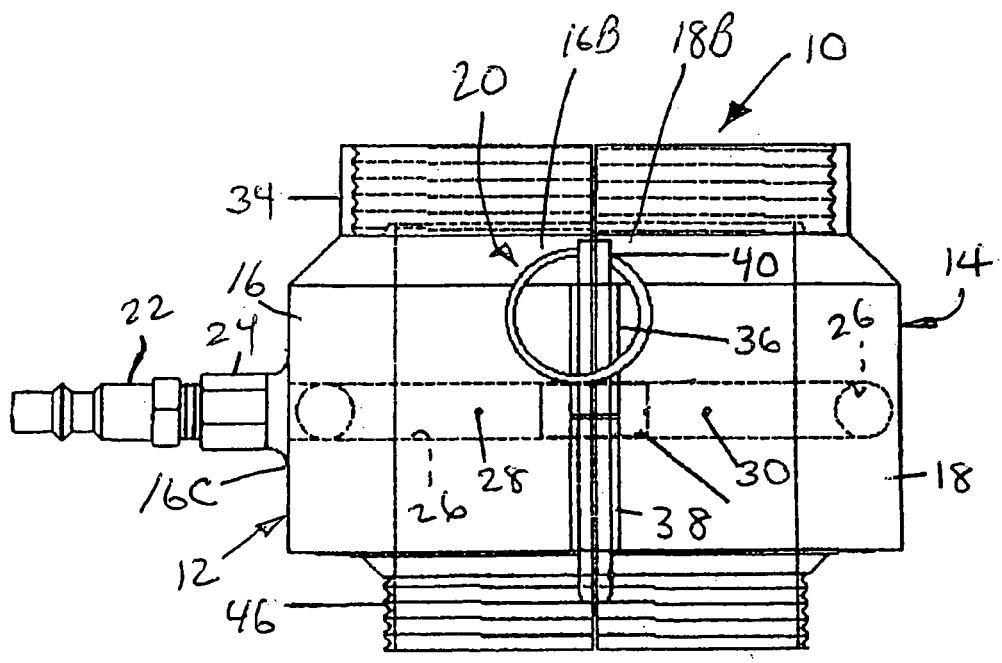
FIG. 3 is another side elevational view of the device as seen along line 3—3 of FIG. 1.

Referring to the drawings and particularly to FIGS. 1 to 3, there is illustrated an automatic wire lubricating device, generally designated 10, of the present invention in assembled form. The device 10 basically includes first and second components 12, 14, each forming a body section 16, 18 of generally arcuate and more particularly of semi-cylindrical configuration, and detachable fastening means 20 at the opposite ends 16A, 16B and 18A, 18B of the respective body sections 16, 18 for releasably securing the first and second components 12, 14 together to provide the device 10 in the assembled condition of FIGS. 1 to 3.

Figure 4:
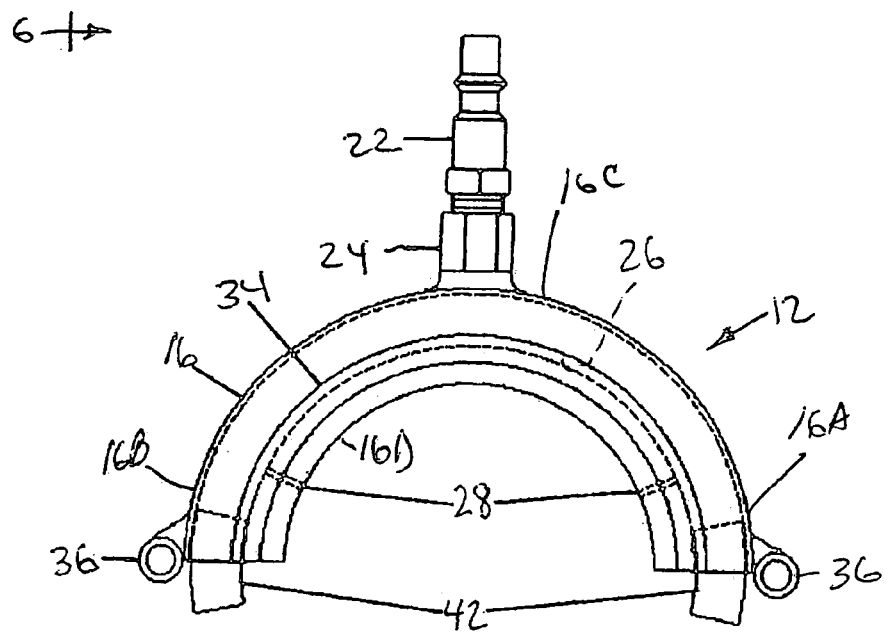
FIG. 4 is a top plan view of a first component of the device representing approximately one half of the device.
Figure 7:
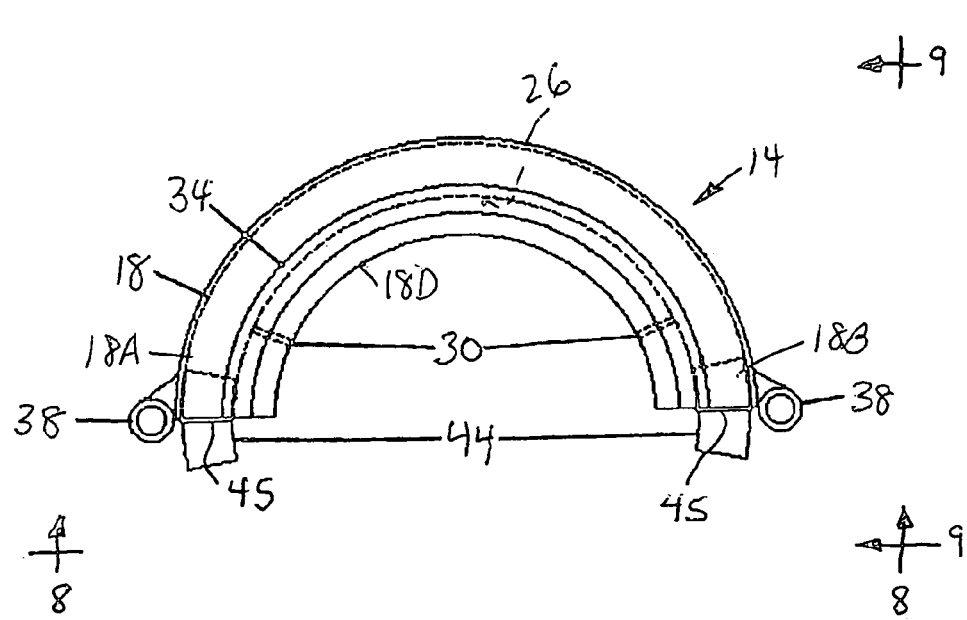
FIG. 7 is a top plan view of a second component of the device representing approximately the other half of the device.
Figure 5:
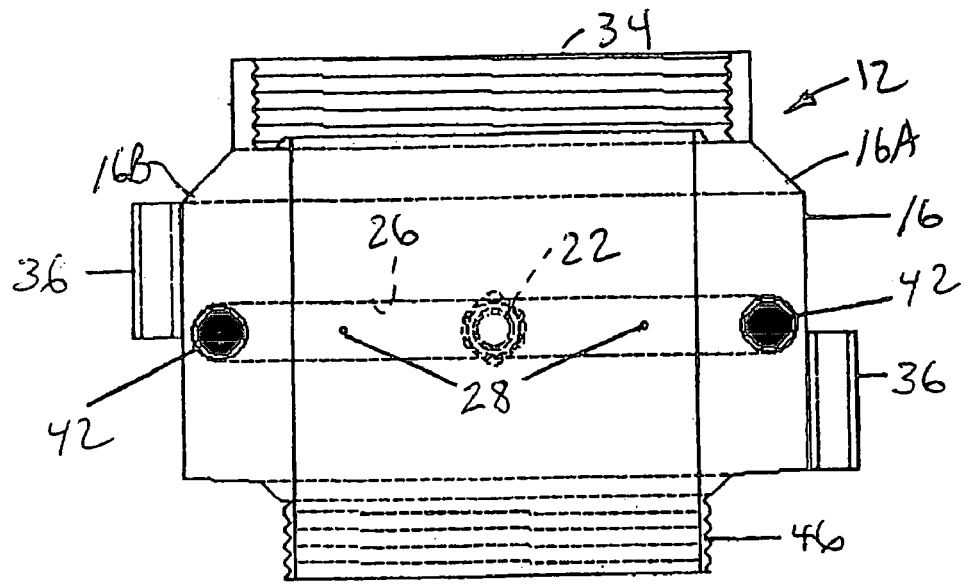
FIG. 5 is a side elevational view of the first component of the device as seen along line 5—5 of FIG. 4.
Figure 6:
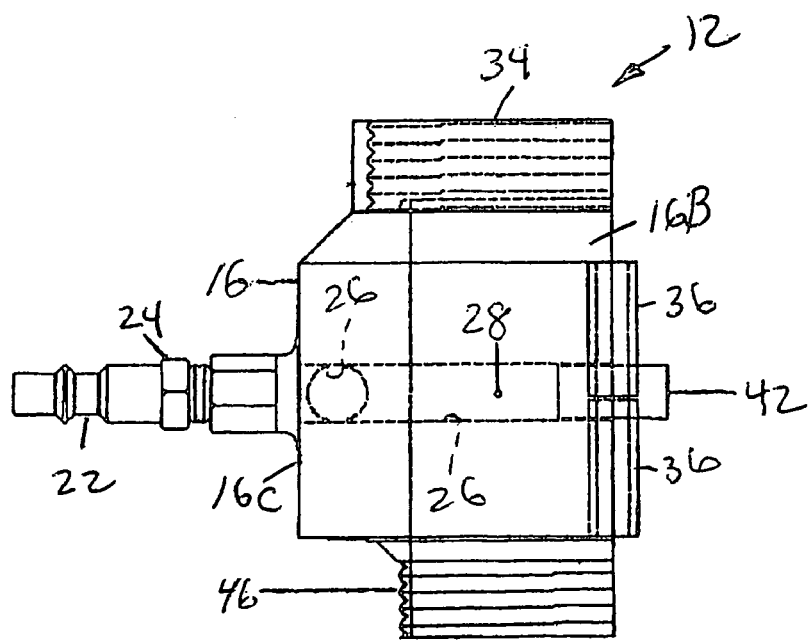
FIG. 6 is another side elevational view of the first component of the device as seen along line 5—5 of FIG. 4.
Figure 8:
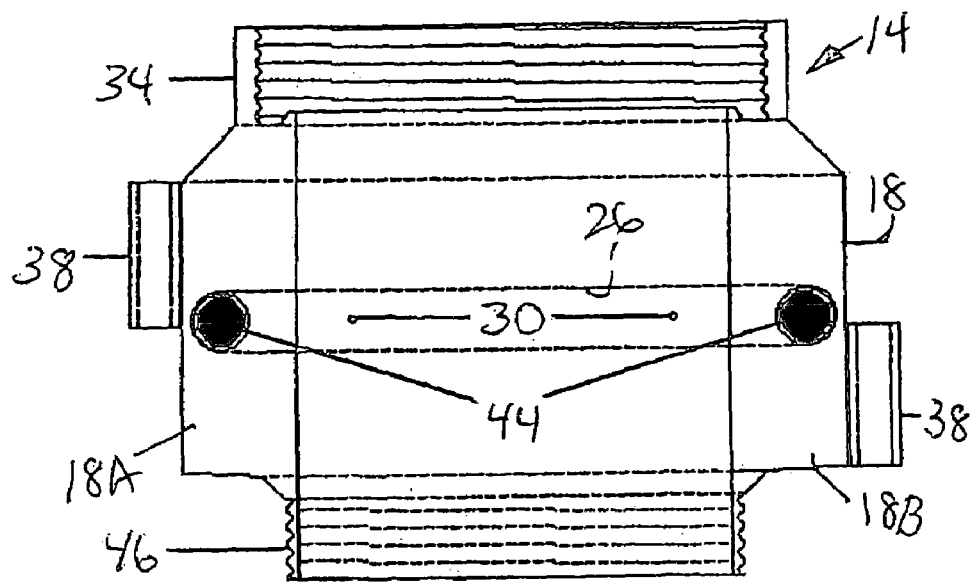
FIG. 8 is a side elevational view of the second component of the device as seen along line 8—8 of FIG. 7.
Figure 9:
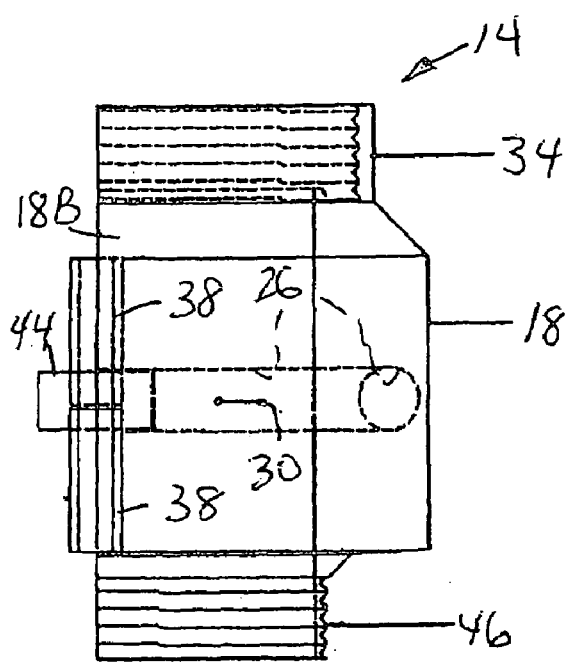
FIG. 9 is another side elevational view of the second component of the device as seen along line 9—9 of FIG. 7.

Referring also to FIGS. 4 to 9, there is illustrated the first component 12 by itself in FIGS. 4 to 6 and the second component 14 by itself in FIGS. 7 to 9. The first component 12 of the device 10 has a quick connect member 22 which fits, such as by being screwed, into a pipe fitting 24 (such as ⅜ inch in size) being attached, such as by being welded, onto an outer circumferential side 16C of the body section 16 of the first component 12. The quick connect member 22 can easily and quickly be attached to a soap line (not shown) coming from a pump (also not shown). The body sections 16, 18 of the respective first and second components 12, 14 each defines one half of a continuous cylindrical interior reservoir 26 formed by the body sections 16, 18 of the first and second components 12, 14 when they are fastened together which is in flow communication with the quick connect member 22 and pipe fitting 24 on the first component 12. The body sections 16, 18 also have respective dispensing or applicator holes 28, 30 defined through the interior walls portions 16D, 18D thereof which provide flow communication between the interior reservoir 26 and a central opening 32 formed through the device 10 by the first and second components 12, 14 thereof when the latter are fastened together.

The first and second components 12, 14 additionally have attached to one of the axially displaced sides of their body sections 16, 18 respective halves of an internally threaded cylindrical clamping flange 34 and formed at their respective angularly displaced ends 16A, 16B, and 18A, 18B sleeves 36, 38 of the detachable fastening means 20 which are offset so as to align axially with one another when the first and second components' 12, 14 are assembled together. The detachable fastening means 20 also includes a pair of pins 40 which are inserted through the pairs of aligned sleeves 36, 38 to hold the two body sections 16, 18 of the first and second components 12, 14 together.

Further, coupler pins 42, 44 are formed at the angularly displaced opposite ends 16A, 16B and 18A, 18B of the body sections 16, 18 of the first and second components 12, 14 which have O-rings around them and fit together so as to make a tight seal of the interior reservoir 26 when the first and second components 12, 14 are fastened together.

The device 10 is connected to and held in place on a threaded end of a conduit (not shown) by attaching the two halves of the internally threaded cylindrical clamping flange 34 about the threaded end of the conduit as explained above by inserting the pins 40 into the aligned sleeves 36, 38. When a pump feeds liquid soap through the quick connect member 22 into the interior reservoir 26, the liquid soap travels 360 degrees through the interior reservoir 26 around the device 10 and squirts out through the interior dispensing or applicator holes 28, 30 onto the wire being pulled through the central opening 32 of the device 10 into the threaded end of the conduit.

The first and second components 12, 14 additionally have attached to the other of the axially displaced sides of their body sections 16, 18 respective halves of an externally threaded cylindrical nipple 46. The nipple 46 allows the attachment of a bushing thereon to keep from scaring the wire or the attachment of a rubber grommet for ensuring a "no mess" application of soap on the wire during a vertical pull thereof.

The actual physical size of the device 10 depends on the trade size of the conduit one is pulling wire through, resulting in a different size device for each trade size of conduit. Also, it should be understood that the device 10 can be manufactured by various suitable conventional methods using various suitable conventional materials and having various different configurations.

In summary, the automatic wire lubricating device 10 is a double pin clamping device that clamps over all trade size conduits and has a small male adapter or quick connect 22 that connects to either a manual or electrical pump for supplying liquid soap into the device 10 and has a plurality of interior holes 28, 30, such as four in number, from which liquid soap is dispensed evenly and completely over the wire so as to lubricate the wire as it is pulled through the central opening 32 of the device 10. The advantages of the device 10 are: (1) mess free application; (2) less cleanup; (3) less manpower required; (4) less expense; and (5) more consistent job of lubricating the wire being pulled.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. An automatic wire lubricating device, comprising:
   (a) two body sections each having opposite ends and respective end faces on said opposite ends, each of said body sections defining a portion of an interior reservoir formed by said body sections when assembled together at said end faces;
   (b) a fastener to releasably fasten said body sections together at said end faces to form an annular body having a longitudinal central axis, said fastener including
      (i) sleeves attached at said opposite ends of each of said body sections and aligned axially with one another in pairs along opposite side axes which extend substantially parallel to said longitudinal central axis and lie substantially in a common plane formed by said end faces when said body sections are assembled into said annular body, and (ii) a pair of pins inserted through one of said pairs of aligned sleeves along said one of said opposite side axes for releasably securing said assembled body sections together;

(c) passages to provide flow communication from said interior reservoir to said central opening when said body sections are fastened together; and (d) threads formed by said assembled body sections at one of said axially displaced ends to attach a member to facilitate application of lubricant on wire being pulled through said threads and said central opening of said annular body.

2. An automatic wire lubricating device, comprising:

(a) two body sections each having opposite ends and respective end faces on said opposite ends, each of said body sections defining a portion of an interior reservoir formed by said body sections when assembled together at said end faces;

(b) a fastener to releasably fasten said body sections together at said end faces to form an annular body having a longitudinal central axis, said fastener including (i) sleeves attached at said opposite ends of each of said body sections in offset relation to one another and extending substantially equidistantly in opposite directions in relation to said interior reservoir, said sleeves at a respective one of said opposite ends of said body sections being aligned axially with one another in pairs along opposite side axes which extend substantially parallel to said longitudinal central axis and lie substantially in a common plane formed by said end faces when said body sections are assembled together into said annular body, and (ii) a pair of pins each inserted through one of said pairs of aligned sleeves along said one of said opposite side axes for releasably securing said assembled body sections together;

(c) passages to provide flow communication from said interior reservoir to said central opening when said body sections are fastened together; and (d) a seal located at said end faces and at opposite ends of halves of said interior reservoir to make a tight seal of and provide communication between said halves of said interior reservoir when said first and second components are fastened together.

3. An automatic wire lubricating device, comprising:

(a) two body sections each having opposite ends and respective end faces on said opposite ends, each of said body sections defining a portion of an interior reservoir formed by said body sections when assembled together at said end faces;

(b) a fastener to releasably fasten said body sections together at said end faces to form an annular body having a longitudinal central axis, said fastener including (i) sleeves attached at said opposite ends of each of said body sections in offset relation to one another and extending substantially equidistantly in opposite direction relative to said continuous cylindrical interior reservoir and partially projecting beyond said flat end faces of said body sections such that said sleeves at a respective one of said opposite ends of said body sections are aligned axially with another in pairs along opposite side axes which extend substantially parallel to said longitudinal central axis of said annular body and lie substantially in a common plane formed by said flat end faces when said body sections of said first and second components are assembled together into said annular body, and (ii) a pair of pins each inserted through and withdrawable from one of said pairs of axially aligned hollow sleeves along one of said oppose side axes for releasably securing said assembled body sections together into said annular body and for taking apart from one another said assembled body sections of said annular body, said pins being inserted in the same one direction along said respective parallel side axes through said pairs of aligned hollow sleeves for releasably securing said assembled body sections together into said annular body and correspondingly said pins being withdrawable in a same other direction being the reverse of said same one direction along said respective parallel side axes from said pairs of aligned hollow sleeves for taking said body sections apart from one another;

(c) circumferentially spaced dispensing holes defined through interior walls portions of said body sections which provide flow communication between said interior reservoir and said central opening;

(d) threads formed by said assembled body sections at one of said axially displaced ends to attach a member to facilitate application of lubricant on wire being pulled through said threads and said central opening of said annular body;

(e) threads formed by the other of the axially displaced ends of said annular body to attach to a threaded end of a conduit through which the wire is to be pulled; and (g) hollow coupler pins attached on said flat end faces and having O-rings disposed around said hollow coupler pins so as to make a tight seal of said interior reservoir at said flat end faces of said body sections when said first and second components are fastened together.

* * * * *